(12) United States Patent
Wei et al.

(10) Patent No.: US 8,495,408 B2
(45) Date of Patent: Jul. 23, 2013

(54) SYNCHRONIZATION METHOD AND DEVICE FOR REAL-TIME DISTRIBUTED SYSTEM WHEREIN EACH MODULE SETS AN INDICATOR TO SIGNAL WHETHER IT IS CURRENTLY ABLE TO OPERATE SYNCHRONOUSLY WITH OTHER MODULES AND RESETS THE INDICATOR AT A UNIFIED SYNCHRONIZATION END TIME

(75) Inventors: Penghui Wei, Shanghai (CN); Yang Wang, Shanghai (CN)

(73) Assignee: Alcatel Lucent, Paris (FR)

( * ) Notice: Subject to any disclaimer, the term of this patent is extended or adjusted under 35 U.S.C. 154(b) by 143 days.

(21) Appl. No.: 13/142,742

(22) PCT Filed: Jan. 23, 2009

(86) PCT No.: PCT/CN2009/000100
§ 371 (c)(1),
(2), (4) Date: Jun. 29, 2011

(87) PCT Pub. No.: WO2010/083626
PCT Pub. Date: Jul. 29, 2010

(65) Prior Publication Data
US 2011/0274192 A1 Nov. 10, 2011

(51) Int. Cl.
*G06F 13/42* (2006.01)
*H04L 27/28* (2006.01)
(52) U.S. Cl.
USPC .......................................... 713/400; 375/260
(58) Field of Classification Search
USPC ....................................................... 713/400
See application file for complete search history.

(56) References Cited

U.S. PATENT DOCUMENTS

| | | | |
|---|---|---|---|
| 5,369,640 A | 11/1994 | Watson et al. | |
| 5,384,906 A * | 1/1995 | Horst | 713/375 |
| 2003/0177154 A1* | 9/2003 | Vrancic | 708/160 |
| 2004/0117682 A1* | 6/2004 | Xu | 713/400 |
| 2005/0050374 A1* | 3/2005 | Nakamura et al. | 713/375 |
| 2006/0259231 A1* | 11/2006 | Ichikawa et al. | 701/115 |
| 2008/0022142 A1* | 1/2008 | Nishioka | 713/375 |
| 2009/0049323 A1* | 2/2009 | Imark et al. | 713/375 |

FOREIGN PATENT DOCUMENTS

| | | |
|---|---|---|
| CN | 1332586 | 1/2002 |
| CN | 1414774 | 4/2003 |
| CN | 101267251 | 9/2008 |

* cited by examiner

*Primary Examiner* — Thomas Lee
*Assistant Examiner* — Robert Cassity
(74) *Attorney, Agent, or Firm* — Carmen Patti Law Group, LLC

(57) ABSTRACT

In order to solve the technical problem that in the current real-time distributed systems such as multi-antenna MIMO system, the implementation of synchronization between distributed modules by means of software is of a large time overhead, the invention proposes a synchronization method and device for the real-time distributed system, the distributed module determines if the present module is able to operate synchronously, at a synchronization start time that is unified with the other distributed modules; sets the present module's operate indication signal in a logic circuit, based on the determining result; and decides whether the present module is to operate synchronously, following a rule unified with the other distributed modules, based on the present module's operate indication signal along with the operate indication signals in the logic circuit set by the other modules. The invention implements real-time synchronization between distributed modules by means of hardware logic circuit with small operation time overhead, and preferably it only needs several-bit logic circuit and several cascaded logic gates, the structure is concise, efficient, and easy to implement and extend.

11 Claims, 2 Drawing Sheets

SYNCHRONIZATION METHOD AND DEVICE FOR REAL-TIME DISTRIBUTED SYSTEM WHEREIN EACH MODULE SETS AN INDICATOR TO SIGNAL WHETHER IT IS CURRENTLY ABLE TO OPERATE SYNCHRONOUSLY WITH OTHER MODULES AND RESETS THE INDICATOR AT A UNIFIED SYNCHRONIZATION END TIME

TECHNICAL FIELD

The invention relates to the real-time distributed system, particularly relates to the synchronization method and device for the processing devices of the wireless MIMO equipment.

BACKGROUND OF THE ARTS

Nowadays, high speed data transmission in wireless communication system becomes more and more important. This trend raises a very high requirement of data processing capability in wireless communication system. Multiple-input Multiple-output (abbr. MIMO) communication system is rising, using several distributed processing devices which contain several digital signal processors (DSP) to process physical layer data in parallel, in MIMO system.

Due to the characteristic of multi-antenna MIMO system, operations such channel estimation for multiple channels, modulating and demodulating for data sent and received by multiple antennas need to be done by every processors synchronously. For example, received data from multi-antenna are needed to be processed synchronously: each processor processes one antenna's received data separately, and every processor process the physical layer data of the same frame and send the data to MIMO demodulator at the same time. Thus, synchronous operation among the several processors turn into extremely necessary.

Currently, synchronization among several processors in multi-antenna MIMO system is realized by means of software. For example, each processor is controlled by its respective controlling process, and every controlling process realizes their synchronization through inter-process communication such as signal value or signal light, semaphore, or shared global variant, and indirectly controls each processor to operate synchronously. In addition, in some current technical solutions, each process is running on a different CPU, and each CPU is connected by Ethernet network. In this case, each process is also synchronized through the Ethernet protocol.

Since the communication speed of multi-antenna MIMO is very high, accordingly, the requirement of synchronization processing speed is also high, thus time overhead for synchronization should be as small as possible, and this often requires real-time synchronization. In the current art, implementing synchronization among distributed modules by means of software, such as inter-process communication, generally has larger latency, especially in the case of there is a large number of processes that need to be synchronized. The synchronization latency is usually as long as several milliseconds to tens of milliseconds, thus it will be difficult to meet the real-time synchronization requirement of the multi-antenna MIMO system.

SUMMARY OF THE INVENTION

In order to provide for the multi-antenna MIMO a high-speed real-time synchronization required by its high-speed communication, it is quite necessary to propose a synchronization method, for distributed modules, which has a fast synchronization speed and a concise structure, and is easy to implement and extend.

According to the embodiment of one aspect of present invention, it is provided a method, in a distributed module of a real-time distributed system, used for operating synchronously with other distributed modules, comprising the following steps: i. Determining if the present module is able to operate synchronously, at a synchronization start time that is unified with the other distributed modules; ii. Setting the present module's operate indication signal in a logic circuit, based on the determining result; iii. Deciding whether the present module is to operate synchronously, following a rule unified with the other distributed modules, based on the present module's operate indication signal along with the operate indication signals of the other modules in the logic circuit.

According to the embodiment of another aspect of present invention, providing one device, in a distributed module of a real-time distributed system, used for operating synchronously with other distributed modules, comprising: means for determining, used for determining if the present module is able to operate synchronously, at a synchronization start time that is unified with the other distributed modules; means for setting, used for setting the present module's operate indication signal in a logic circuit, based on the determining result; means for deciding, used for deciding whether the present module is to operate synchronously, following a rule unified with the other distributed modules, based on the present module's operate indication signal along with the operate indication signals of the other modules in the logic circuit.

Preferably, a start interrupt signal generated by a counter controlling the present module indicates the synchronization start time, this start interrupt signal is synchronized with the start interrupt signals provided for the other modules by other counters controlling the other modules, the counter controlling the present module is driven by a first clock signal, the first clock signal is synchronized with clock signals that drive the counters controlling the other modules. Setting the present module's operate indication signal to logic true when the present module is able to operate synchronously; otherwise, setting the present module's operate indication signal to logic false. Distributed modules determine the logical AND of the present module's operate indication signal with the other modules' operate indication signals: deciding the present module is to operate synchronously if the result of the logical AND is true; otherwise, deciding the present module is not to operate synchronously.

Embodiment of the present invention realizes the synchronous operation of distributed modules in real-time distributed system, such as multi-antenna MIMO system that comprises multiple parallel DSP processors, by means of hardware. Since the time required by the logic setting, calculation and determining operations for the logic devices in logic circuit is very short, the embodiments of present invention realize the synchronization among distributed modules with a smaller time overhead, synchronize multiple processor real-time in a high speed, improve the processing capacity of real-time synchronous data processing in MIMO communication equipment, and meet the requirement of the complicated algorisms of multi-antenna MIMO system, then increase the communication speed. Furthermore, the preferred embodiment of present invention only needs two-bit logic circuit and several logic gates, the structure is concise, efficient, and easy to implement, and it has a convenient way of cascading expansion.

BRIEF DESCRIPTION OF THE DRAWINGS

Other features, objective and advantage of the invention will become obvious by reading the detailed description to the non-limiting embodiments with reference to the following drawings.

Figure 1:
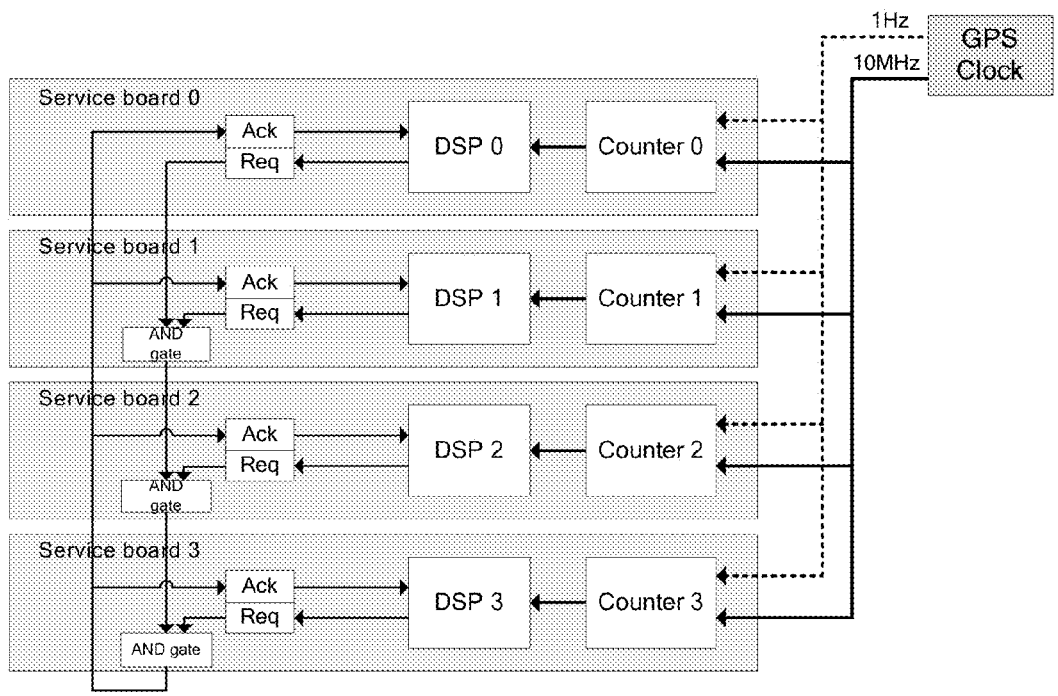
FIG. 1 is the a system architecture for realizing synchronization in a 4×4 MIMO receiver, according to an embodiment of the invention.

In the drawings, the same or similar reference signs denote the same or similar components.

DETAILED EMBODIMENT OF THE INVENTION

Figure 2:
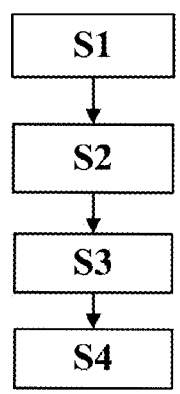
FIG. 2 is the flow chart of the method, using by one DSP in a MIMO receiver shown in FIG. 1 to operate synchronously with other DSP, according to an embodiment of the invention.
Figure 3:
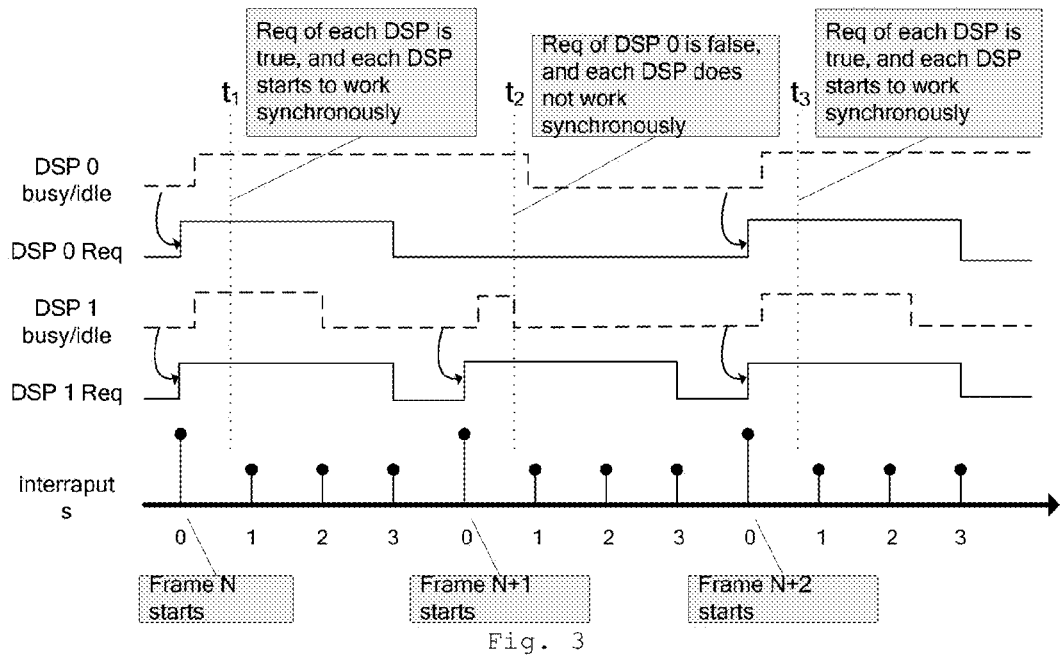
FIG. 3 shows the time sequence diagram of logic signals for synchronization of each of DSP 0 and another synchronous DSP 1 in the MIMO receiver showing in FIG. 1, according to an embodiment of the invention.

The following part will elucidate the embodiment of the invention from the view point of method, by referring to FIG. 1 to FIG. 3.

FIG. 1 is the system architecture of a 4×4 MIMO receiver, according to present invention. The system has 4 service boards, namely service board 0, 1, 2, and 3. Each board has one DSP processor, namely DSP 0, 1, 2, and 3, and each DSP is used to process the data from one of the four antennas of the MIMO receiver respectively. Those ordinary skilled in the art is able to understand that, since antenna receives data continuously, but the DSP unit reads data in bursts, thus the buffer zone (Buffer) is generally configured between the antenna and the DSP processor. Data received by the antenna was firstly saved to the buffer zone by FPGA (Field Programmable Gate Array), and the DSP reads data from the buffer. In order to simplify FIG. 1, antenna, FPGA and buffer zone described above are not shown in FIG. 1.

On each service board of the receiver, there is a counter, which provides interrupt signals for DSP processor. Every counter synchronously provides interrupt signals for each DSP processor, and the interrupt signal is used for indicating, for each DSP processor, the synchronization time that is unified with the other DSP processors, such as the synchronization start time, synchronization end time, etc. Every counter is connected to a same GPS (Global Positioning System) clock. The GPS clock receives satellite signals from the sky, recovers globally unified time information from the satellite signal, and provides a unified 10 MHz drive signal for every counter.

In addition, the GPS clock also provides one unified 1 Hz time synchronous signal for each counter, in order to synchronize the counting logic of every counter. There are two purposes by using the clock synchronous signal to synchronize the count logic of counters.

1. Since the DSP processor on each service board are indicated by the interrupt signal provided by the counter of each service board, whereas the start up time of each counter of each service board might be different, thus if not using 1 Hz to synchronize each counter, the interrupt signal generated by each counter for corresponding DSP processor might not be generated at the same time, thus leads to deviation in synchronization for the DSP processor. The embodiment of present invention uses 1 Hz rising edge to trigger synchronization, and to reset and synchronize the counting logic of each counter every one second. Thereby it is able to guarantee the counter of each board generates interrupt signal synchronously.

2. The counting logic of the counter is driven by the 10 MHz clock, whereas, since the MIMO receiver in the base station and the mobile terminal are using different GPS clock, there is some frequency difference in the separately generated 10 MHz clock. The 1 Hz clock is used to reset the counting logic of each counter, so as to eliminate the cumulative effect of frequency difference between base stations and mobile terminals.

Understandably, the above unified 1 Hz clock synchronous signal is not a must for the present invention, and any other method is applicable for achieve the count logic synchronization between various counter of various service board, and for eliminating the cumulation of frequency difference between base stations and mobile terminals.

In addition, as shown by the figures, each service board also respectively has one-bit logic device Req and logic device Ack, which are connected with the DSP processor. Wherein, the logic value (namely true/false, 1/0, or valid/invalid, etc) of each logic device Req is set by the DSP processors, and this logic value is used to represent the operate indication signal of the DSP processor, and determines if the DSP processor is able to operate synchronously. In an one-bit logic circuit, the logic values of the logic devices Req on each service board are preformed with logic AND through multiple AND gates, and the result of the logic AND is sent in the one-bit logic circuit back to (is set on) every logic device Ack of each service board. The logic device Ack sends the logic AND result of each logic device Req to the DSP processor. In the present embodiment of present invention, the logic device Req and the logic device Ack are separate from the DSP processor; those skilled in the art are able to understand that, in other embodiments, the logic device Req and the logic device Ack can be integrated in the DSP processor, and their functions are realized by the DSP processor. One or more pins of the DSP processor are connected with corresponding logic circuit, which includes logic devices such as AND gate. These and other manners of implementation are all in the protection scope of claims of present invention.

In the present embodiment, within the time of every data frame, each counter synchronously generates four interrupt signals with the same time interval. Each synchronous interrupt signal indicates each time in a frame for each DSP processor, and also indicates the synchronization time including the synchronization start time, the synchronization end time, etc. Wherein, the first interrupt signal indicates that the frame starts, this start interrupt signal indicates a unified synchronization start time for each DSP processor, the fourth interrupt signal indicates that the frame is going to end, this end interrupt signal indicates a unified synchronization end time for each DSP processor. Preferably, when generating the interrupt signal, the counter also generates an interrupt signal serial number, eg. 0, 1, 2, and 3, as shown in FIG. 3. The interrupt signal index can indicate which synchronization time it is as the interrupt signal is generated meanwhile, and these two together indicate every synchronization time for the DSP processor more accurately, avoiding the confusion that may arise by using interrupt signals only. Understandably, the interrupt signal index is not a must, for example, when DSP processor itself measures and maintains the coming number of interrupt signal and the synchronization time indicated thereby, the interrupt signal index can be omitted.

At the beginning of the frame N, shown as FIG. 3, each counter generates a start interrupt signal and an interrupt signal index 0. After receiving the interrupt signal and its index, each DSP processor knows it is the synchronization start time unified with other DSP processors, then shown as FIG. 2, in step S1, DSP 0 determines whether the present processor is able to operate synchronously. Similarly, other DSP processors also respectively determine whether the present processor is able to operate synchronously.

In an embodiment, each DSP processor maintains an internal busy/idle flag respectively, indicating if the present DSP processor is in progress of data processing. In the present embodiment, if the flag is logic false, it indicates the present processor has no not-finished job, is idle currently, and is able to synchronously process a new frame of communication data; if the flag is logic true, it indicates the present processor is handling the not-finished job, and is not able to synchronously process new data. Understandably, the present invention is not limit to this scheme, in which the DSP processor indicates and determines the present processor's operating status by the busy/idle flag. In this case, in present frame N, shown as FIG. 3, at interrupt signal 0, the busy/idle flag of DSP 0 is logic false, whereas at step S2, the DPS 0 sets the logic device Req, which is in the logic circuit, of present service board to logic true, indicating the present processor is able to operate synchronously. The busy/idle flag of DSP1, 2 and 3 are also logic false, then they also set the logic device Req to logic true. In order to simplify the figure, FIG. 3 only shows the busy/idle flag of DSP1 and the set logic device Req. Preferably, the start interrupt signal is also a reading interrupt signal simultaneously, it indicates the first reading time in the present data frame time: before detecting and determining the logic value of logic device Ack, in order to save time, the idle DSP processors can read data received by antenna from the buffer, and do certain data pre-processing. In this preferable case, each processor switches into busy, and the busy/idle flag becomes to logic true.

Then, in step S3, DSP 0 determines if it is to operate synchronously, according to a unified rule with other DSP processors, based on the logic device Req set by the present processor and other logic devices Req respectively set in the logic circuit by other DSP processors. Other DSP processors also do the similar operation, determining if it is to operate synchronously, according to the unified rule with other DSP processors.

Specifically, according to the function of logic circuit mentioned above in FIG. 1, the operate indicate signals set by the DSP processors, which is the logic values of the logic devices Req, are performed with logic AND, and the result is set as the logic value of the logic device Ack on each service board. The unified rule used by each DSP processor is, determining the logic AND of logic values of logic device Req of the present DSP processor with logic values of other DSP processors is true or false: when the logic AND is true, determining the present DSP processor is to operate synchronously, otherwise, determining the present DSP processor is not to operate synchronously.

Understandably, in the actual system, after setting the value of logic device Req, since the time at which each DSP processor sets the logic value of logic device Req is not necessarily the same, and the logic circuit also needs some time to do the logic AND operation and to set the logic value of logic device ACK on each service board, each DSP processor should wait for a short while from several microseconds to a dozen microseconds before detecting the ACK signal. During this waiting time, preferably, in order to use DSP processor more efficiently, the processors do the data pre-processing mentioned previously, so as to save time appropriately. Understandably, each DSP processor may not do the data pre-processing after setting its Req signal, and it just simply waits for several microseconds to dozen microseconds and detects and determines the Ack signal.

In the present frame, since all the operate indicate signals of every DSP processors are true, then they start to operate synchronously at time $t_1$, and carry out MIMO data processing. Preferably, each DSP processor determines to continue data processing on the basis of the data pre-processing mentioned previously.

Then, the second interrupt signal, namely the interrupt signal 1 is a reading interrupt signal, it indicate the second reading time in the time of present data frame, at which each DSP processor can read follow-up data from the buffer and continue data processing. Taking the method of reading from buffer multiple times in a frame is able to increase the buffer reading frequency of the DSP processor, accordingly reduce the capacity requirement of A/B buffer. Preferably, since the rate of antenna receiving is faster, and it generally keeps saving data in the buffer at the speed of 80 Mhz, whereas the DSP processor read in bursts, the buffer is generally implemented by using the manner of A/B buffer, that is, at the same time when FPGA saves data to buffer A, the DSP read from buffer B. Therefore, when the above interrupt signal 0 occurs, the DSP processor can read data from buffer A; when interrupt signal 1 occurs at the present time, the DSP processor can read data from buffer B, and so fourth.

Then, shown as FIG. 3, the third interrupt signal, namely the interrupt signal 2 is another reading interrupt signal, indicating the third reading time in the time of the present data frame, and data processing of DSP 1 is finished, the busy/idle flag is turned to false; but the processing of DSP 0 is not finished, then it continues reading follow-up data from buffer, and continues data processing. In addition, data processing of DSP 2 and 3 are also finished, the busy/idle flag is turned to false (not shown in figure).

Then, before the end of the time of this frame and the start of the time of the next frame, the fourth interrupt signal, namely the interrupt signal index 3 is an end interrupt signal, it indicates a unified synchronization end time. In step S4, DSP 0 sets the operate indicate signal on the logic device Req to logic false, other DSP processors also do the similar operation. The interrupt signal is also a reading interrupt signal simultaneously, it indicates the forth reading time of present data frame time, since in present embodiment, the processing of DSP 0 is not finished, it continues reading follow-up data from buffer, and continues processing data.

At the start of frame N+1, similar to the beginning of frame N above, each counter synchronously generates a start interrupt signal and an interrupt signal index 0 (the interrupt signal index in frame N+1 can also continue numbering by following the last interrupt signal index of frame N), indicating a unified synchronization start time for each DSP processor.

In step S1', the DSP 0 determines if it is able to operate synchronously. Since it has not finished processing data of frame N, the busy/idle flag is still true, and it must finish processing the rest data, causing it is not able to synchronously process new frame data in the frame time of frame N+1. Thus in step S2', DSP 0 sets the operate indicate signal namely the logic device Req of service board 0 to logic false.

As to DSP 1, 2, and 3, since they have finished processing the data of the previous frame, their busy/idle flag are false, and they are able to synchronously process new frame data in the frame time of frame N+1. Therefore, they set the operate indicate signal namely the logic device Req on each service board to logic true respectively. Afterwards, DSP 1, 2, and 3 read data received by antenna from the buffer, and do certain data pre-processing, and their busy/idle flags turn to true. Then in step S3', at the moment of $t_2$, since the logic value of the logic device Req of DSP 0 is false, the logic AND of operate indicate signals of the DSP processors is false, and the DSP 0 determines the present DSP processor not to operate synchronously in N+1 frame time, based on the logic value. Other DSP processors also determine not to operate synchronously in present N+1 frame time accordingly, and they can abandon the result of pre-processing, and convert the busy/idle flag to false.

Then, within the time of the frame N+1, DSP 0 completes data process of previous data frame. At the fourth interrupt signal, arriving before the frame N+1 ends and the next frame starts, the DSP 0 set the operate indicate signal, namely logic device Req, to logical false.

Then, when frame N+2 starts, similar to previous frame N starts, every counter synchronously generates a start interrupt signal and an interrupt signal index 0, in order to indicate a unified synchronization start time for every DSP processor. Since each DSP processors are at idle status at this moment, thus they are able to operate synchronously in frame N+2. Afterwards, each processor do the setting of operate indicate signal, and determine to start operating synchronously at the moment of $t_3$. The detailed steps are similar to the aforementioned frame N, and unnecessary description will not be given.

The above part elucidated one embodiment of the method of present invention. The following part will elucidate another embodiment of the invention from the view point of device, by referring to FIG. 4.

Figure 4:
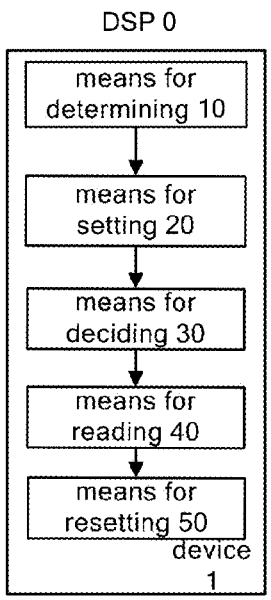
FIG. 4 shows the block diagram of the device, in a DSP processor of a MIMO receiver, for operating synchronically with other DSP processors, according to an embodiment of the invention.

FIG. 4 shows the block diagram of the device 1, in a DSP processor of a MIMO receiver, for operating synchronically with other DSP processors, according to another embodiment of the invention. The device 1 comprising a determining means 10, a setting means 20, a deciding means 30 and preferable a resetting means 50. MIMO receivers, each service boards, DSP processors, each counters, clocks and logic devices Req, AND gates, and Acks are shown as FIG. 1, and are similar to the embodiment of method of present invention, and unnecessary description will not be given.

At the beginning of the frame N, shown as FIG. 3, each counter generates a start interrupt signal and an interrupt signal index 0. After receiving the interrupt signal and its index, each DSP processor knows it is the synchronization start time unified with other DSP processors, then shown as FIG. 2, the determining means 10 of device 1 of DSP 0 determines whether the present processor is able to operate synchronously. Similarly, the determining means of other DSP processors also respectively determine whether the present processor is able to operate synchronously.

In an embodiment, each DSP processor maintains an internal busy/idle flag respectively, indicating if the present DSP processor is in progress of data processing. In the present embodiment, if the flag is logic false, it indicates the present processor has no not-finished job, is idle currently, and is able to synchronously process a new frame of communication data; if the flag is logic true, it indicates the present processor is handling the not-finished job, and is not able to synchronously process new data.

In the present frame N, shown as FIG. 3, at interrupt signal 0, the busy/idle flag of DSP 0 is logic false, then the setting means 20 sets the logic device Req, which is in the logic circuit, of present service board to logic true, indicating the present processor is able to operate synchronously. The busy/idle flag of DSP1, 2 and 3 are also logic false, then they also set the logic device Req to logic true. In order to simplify the figure, FIG. 3 only shows the busy/idle flag of DSP1 and the set logic device Req. Preferably, the start interrupt signal is also a reading interrupt signal simultaneously, it indicates the first reading time in the present data frame time: before detecting and determining the logic value of logic device Ack, in order to save time, the determining means 10 determines the present idle DSP processor to read data received by antenna from the buffer, and do certain data pre-processing. Thus, each reading means 40 of every processor read data from the buffer, DSP processor processes data received, and switches into busy, and the busy/idle flag becomes to logic true.

Then, the deciding means 30 determines if DSP 0 is to operate synchronously, according to a unified rule with other DSP processors, based on the logic device Req set by the present processor and other logic devices Req respectively set in the logic circuit by other DSP processors. Other DSP processors also do the similar operation, determining if it is to operate synchronously, according to the unified rule with other DSP processors.

Specifically, according to the function of logic circuit mentioned above in FIG. 1, the operate indicate signals set by the DSP processors, which is the logic values of the logic devices Req, are performed with logic AND, and the result is set as the logic value of the logic device Ack on each service board. The unified rule used by the deciding means 30 is, determining the logic AND of logic values of logic device Req of the present DSP processor with logic values of other DSP processors is true or false: when the logic AND is true, determining the present DSP processor is to operate synchronously, otherwise, determining the present DSP processor is not to operate synchronously.

Understandably, in the actual system, after setting the value of logic device Req, since the time at which each DSP processor sets the logic value of logic device Req is not necessarily the same, and the logic circuit also needs some time to do the logic AND operation and to set the logic value of logic device ACK on each service board, each DSP processor should wait for a short while from several microseconds to a dozen microseconds before detecting the ACK signal. During this waiting time, preferably, in order to use DSP processor more efficiently, the processors do the data pre-processing mentioned previously, so as to save time appropriately.

In the present frame, since all the operate indicate signals of every DSP processors are true, then they start to operate synchronously at time $t_1$, and carry out MIMO data processing. Preferably, the deciding means 30 determines the present DSP processor to continue data processing on the basis of the data pre-processing mentioned previously.

Then, the second interrupt signal, namely the interrupt signal 1 is a reading interrupt signal, it indicate the second reading time in the time of present data frame, at which the reading means 40 can read follow-up data from the buffer, and DSP processor continues data processing based on the follow-up data read. Preferably, since the rate of antenna receiving is faster, and it generally keeps saving data in the buffer at the speed of 80 Mhz, whereas the DSP processor read in bursts, the buffer is generally implemented by using the manner of A/B buffer, that is, at the same time when FPGA saves data to buffer A, the DSP read from buffer B. Therefore, when the above interrupt signal 0 occurs, the DSP processor can read data from buffer A; when interrupt signal 1 occurs at the present time, the DSP processor can read data from buffer B, and so fourth. Taking the method of reading from buffer multiple times in a frame is able to increase the buffer reading frequency of the DSP processor, accordingly reduce the capacity requirement of A/B buffer.

Then, shown as FIG. 3, the third interrupt signal, namely the interrupt signal 2 is another reading interrupt signal, indicating the third reading time in the time of the present data frame, and data processing of DSP 1 is finished, the busy/idle flag is turned to false; but the processing of DSP 0 is not finished, then the reading means 40 continues reading follow-up data from buffer, and DSP 0 continues data processing. In addition, data processing of DSP 2 and 3 are also finished, the busy/idle flag is turned to false (not shown in figure).

Then, before the end of the time of this frame and the start of the time of the next frame, the fourth interrupt signal, namely the interrupt signal index 3 is an end interrupt signal, it indicates a unified synchronization end time. In step S4, DSP 0 sets the operate indicate signal on the logic device Req to logic false, other DSP processors also do the similar operation. The interrupt signal is also a reading interrupt signal simultaneously, it indicates the forth reading time of present data frame time, since in present embodiment, the processing of DSP 0 is not finished, the reading means 40 continues reading follow-up data from buffer, DSP 0 continues processing data.

At the start of frame N+1, similar to the beginning of frame N above, each counter synchronously generates a start interrupt signal and an interrupt signal index 0 (the interrupt signal index in frame N+1 can also continue numbering by following the last interrupt signal index of frame N), indicating a unified synchronization start time for each DSP processor.

The determining means 10 determines if DSP 0 is able to operate synchronously. Since DSP 0 has not finished processing data of frame N, the busy/idle flag is still true, and it must finish processing the rest data, causing it is not able to synchronously process new frame data in the frame time of frame N+1. Thus the setting means 20 sets the operate indicate signal namely the logic device Req of service board 0 to logic false.

As to DSP 1, 2, and 3, since their determining means determines that they have finished processing the data of the previous frame, their busy/idle flag are false, and they are able to synchronously process new frame data in the frame time of frame N+1. Therefore, they set the operate indicate signal namely the logic device Req on each service board to logic true respectively. Afterwards, the reading means of DSP 1, 2, and 3 respectively read data received by antenna from their respective buffers, do certain data pre-processing, and their busy/idle flags turn to true.

Then at the moment of $t_2$, since the logic value of the logic device Req of DSP 0 is false, the logic AND of operate indicate signals of the DSP processors is false, the deciding means 30 of DSP 0 determines the present DSP processor not to operate synchronously in N+1 frame time, based on the logic value. Other DSP processors also determine not to operate synchronously in present N+1 frame time accordingly, and they can abandon the result of pre-processing, and convert the busy/idle flag to false.

Then, within the time of the frame N+1, DSP 0 completes data process of previous data frame. At the fourth interrupt signal, arriving before the frame N+1 ends and the next frame starts, the DSP 0 sets the operate indicate signal, namely logic device Req, to logical false.

Then, when frame N+2 starts, similar to previous frame N starts, every counter synchronously generates a start interrupt signal and an interrupt signal index 0, in order to indicate a unified synchronization start time for every DSP processor.

Since each DSP processors are at idle status at this moment, thus they are able to operate synchronously in frame N+2. Then after the determining means of each processor determines to be able to operate synchronously, each setting means do the setting of operate indicate signal, and each determine means determines to start operating synchronously at the moment of $t_3$. The detailed steps are similar to the aforementioned frame N, and unnecessary description will not be given.

Above describes the present invention, by using the example in which the DSP processors synchronously read from buffer and process data received by each antenna in multi-antenna MIMO system. Understandably, the present invention is also applicable for the DSP synchronously processing transmitting data of each antenna and providing the data via buffer zone for each antenna, wherein, the synchronization process of each DSP is similar to mentioned above procedure. In synchronization operation process, similarly to the reading time above, each DSP processor uses a write device to write communication data into buffer zone connected to the antenna corresponding to the present DSP processor at several write time in the time of communication frame. The write time is indicated by multiple write interrupt signals provided by counter which controls present DSP processor.

Understandably, the time of the above logic setting, calculation and determinations, in logic devices in the hardware logic circuits, is very short and generally only needs several microseconds to a dozen microseconds, thus the time overhead needed for synchronization is much less than the several milliseconds to dozen milliseconds which is present in the traditional software inter-process communications. It synchronizes multiple DSP processors in real time, guarantees synchronization processing speed of DSP processors, and increases the communication speed of multi-antenna MIMO communication system. Furthermore, the implementation of present invention only needs several logic circuits such as logic AND gates, and the structure is concise and efficient, and easy to implement. And since each logic AND gate is connected by cascading, when it is required to increase or decrease service boards or DSP processors according to the capacity of system, it only needs to increase or decrease the cascading connection of logic devices, which is quite convenient for extension, and does not increase the time overhead for synchronize.

Above describe the present invention based on the example in which whether to operate synchronously is determined according to the logic AND of operate indication signals of each DSP processor. Understandably, the present invention is not limited to synchronization according to logic AND, for example, when the operate indicate signal of DSP processor uses logic false to indicate it is able to operate synchronously and logic true to indicate it is not able to operate, corresponding logic function is the logic OR of each operate indicate signals: when the logic OR is false, each DSP processor works synchronously; otherwise, each DSP processor does not operate synchronously. The logic circuit is able to use cascading of several OR gates to implement the technical solution. According to instruction of present invention, those skilled in the art is able to design a configuration, a determination logic of operate indicate signal, and a corresponding logic circuit, based on actual system requirement, these solution are all within the scope of protection claimed by present invention. And the description will not give unnecessary details.

In the embodiment above, each counter, which is synchronized with each other and driven by same GPS clock, provides unified synchronization start time and synchronization end time to each DSP processor respectively. Those skilled in the art is able to understand that the present invention is not limited to this: each counter is also able to be driven respectively by several synchronous clocks with the same source frequency, such as atomic clock; or each DSP processor shares one counter, etc. These schemes and other unmentioned schemes are all within the scope of protection claimed by present invention.

Above describes the present invention by application of the present invention in MIMO communication device of wireless communication. Understandably, the present invention is not limited to this, and is applicable for any device requiring real-time distributed processing, such as multi-processors computer for real-time distributed computing used for network protocol simulation, or router computing. Based on the present invention, those skilled in the art is able to reasonably predict that every real-time distributed system is equivalent and alternative of the multi-antenna MIMO device mentioned in embodiment of present invention, and the present invention is also applicable for these alternative equivalents.

Above described the embodiment of the present invention, what is needed to understand is, the present invention is not limited to specific embodiment mentioned above, those skilled in the art is able to make various variation and modification within the scope of right claimed in appendix.

What is claimed is:

1. A method, in a distributed module of a real-time distributed system, used for operating synchronously with other distributed modules, comprising the steps of:
   i. determining when a present module is able to operate synchronously, at a synchronization start time that is unified with the other distributed modules;
   ii. setting the present module's operate indication signal in a logic circuit, based on the determining result;
   iii. deciding whether the present module is to operate synchronously, following a rule unified with the other distributed modules, based on the present module's operate indication signal along with the operate indication signals in the logic circuit respectively set by the other distributed modules; and
   iv. resetting the operate indication signal of the present module in the logic circuit, at a synchronization end time unified with the other distributed modules, the unified synchronization end time being indicated by an end interrupt signal which is provided by a counter that controls the present module, and the end interrupt signal being synchronized with the end interrupt signals provided for the other distributed modules by the counters that control the other distributed modules.

2. The method according to claim 1, further comprising the step of indicating the synchronization start time by a start interrupt signal generated by a counter that controls the present module, wherein the start interrupt signal is synchronized with the start interrupt signals provided for the other distributed modules by other counters that control the other distributed modules, and wherein the counter that controls the present module is driven by a first clock signal, the first clock signal being synchronized with clock signals that drive the counters that control the other distributed modules.

3. The method according to claim 2, further comprising the step of indicating the synchronization start time by an interrupt signal index provided by the counter that controls the present module.

4. The method according to claim 2, further comprising the step of synchronizing, by a second clock signal, the counter that controls the present module with the counters that control the other distributed modules.

5. The method according to claim 1, wherein in said step i: determining when the present module is able to operate synchronously is based on a busy/idle flag;

determining the present module is able to operate synchronously when the busy/idle flag is in idle;
otherwise, determining the present module is unable to operate synchronously.

6. The method according to claim 1, wherein in said step ii:
setting the present module's operate indication signal to logic true when the present module is able to operate synchronously;
otherwise, setting the present module's operate indication signal to logic false;
said step iii comprises:
determining the logical AND of the present module's operate indication signal with the other distributed modules' operate indication signals;
deciding the present module is to operate synchronously when the result of the logical AND is true;
otherwise, deciding the present module is not to operate synchronously.

7. The method according to claim 6, wherein in said step i:
determining the present module to do pre-operate when the present module is able to operate synchronously;
and in step iii:
deciding the present module is to operate synchronously on the basis of the pre-operate when deciding the present module is to operate synchronously.

8. The method according to claim 1, wherein a real-time distributed system is a Multiple-input Multiple-output (MIMO) communication equipment used for wireless communication, and wherein the present module and the other distributed modules are signal processing devices of the MIMO communication equipment.

9. The method according to claim 8, further comprising the following steps after step iii:
reading data from a buffer zone connected to an I/O device that corresponds to the present module for processing respectively at multiple reading time points in a communicating frame when the present module is operating synchronously, the multiple reading time points being indicated by reading interrupt signals provided by the counter that controls the present module; and/or,
writing date to a buffer zone connected to an I/O device corresponding to the present module, respectively at multiple writing time points in a communicating frame when the present module is operating synchronously, the multiple writing time points being indicated writing interrupt signals provided by the counter that controls the present module.

10. A device, in a distributed module of a real-time distributed system, used for operating synchronously with other distributed modules, comprising:
means for determining when a present module is able to operate synchronously at a synchronization start time that is unified with the other distributed modules;
means for setting the present module's operate indication signal in a logic circuit based on the determining result;
means for deciding whether the present module is to operate synchronously, following a rule unified with the other distributed modules, based on the present module's operate indication signal along with the operate indication signals in the logic circuit set by the other distributed modules; and
means for resetting the operate indication signal of the present module in the logic circuit at a synchronization end time unified with the other distributed modules, the unified synchronization end time being indicated by an end interrupt signal which is provided by a counter that controls the present module, and the end interrupt signal being synchronized with the end interrupt signals provided for the other distributed modules by the counters that control the other distributed modules.

11. The device according to claim 10, wherein the synchronization start time is indicated by a start interrupt signal generated by a counter that controls the present module, the start interrupt signal being synchronized with the start interrupt signals provided for the other distributed modules by other counters that control the other distributed modules, the counter that controls the present module being driven by a first clock signal, the first clock signal being synchronized with clock signals that drive the counters that control the other distributed modules.

* * * * *